Patented Sept. 26, 1922.

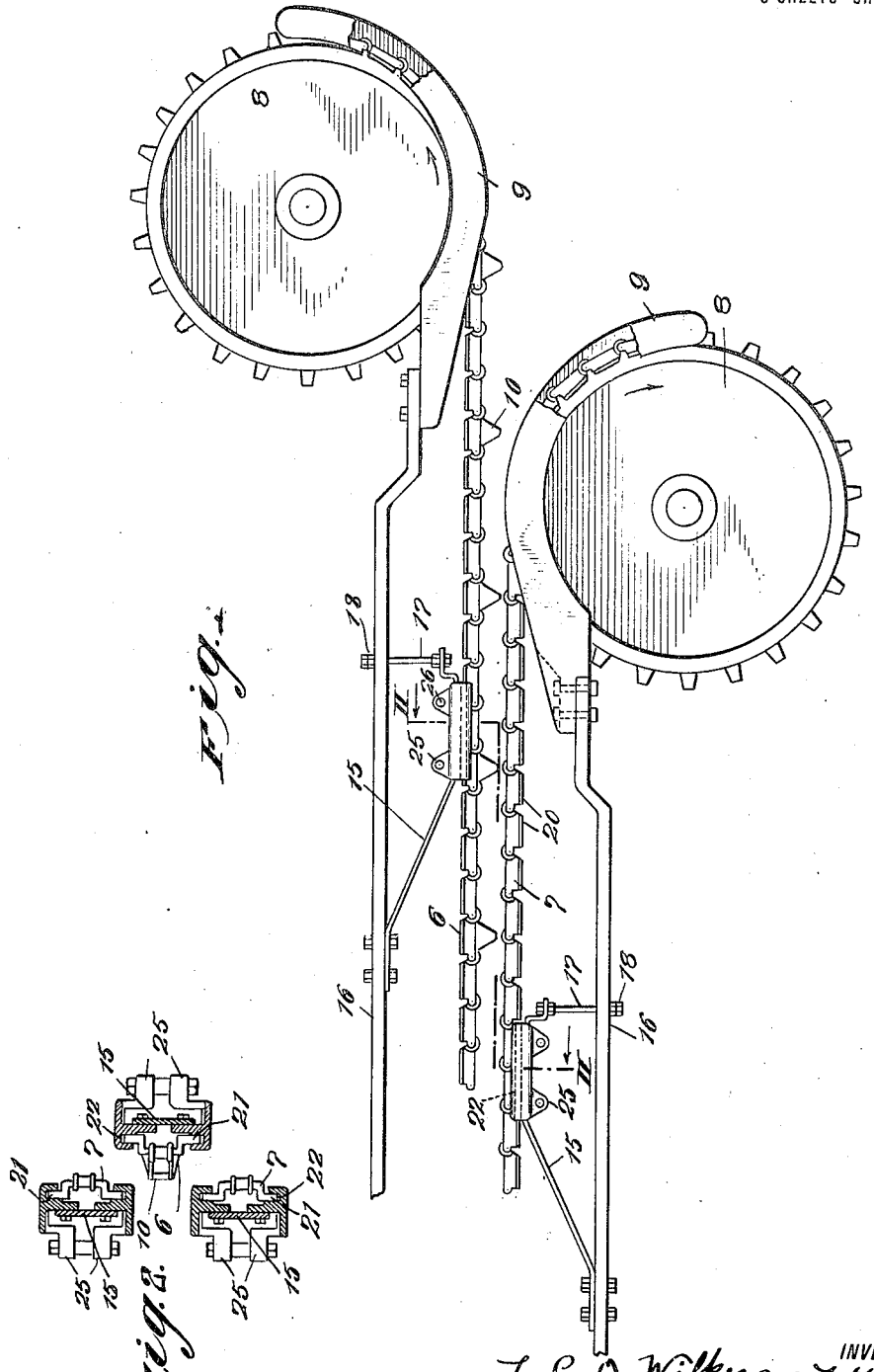

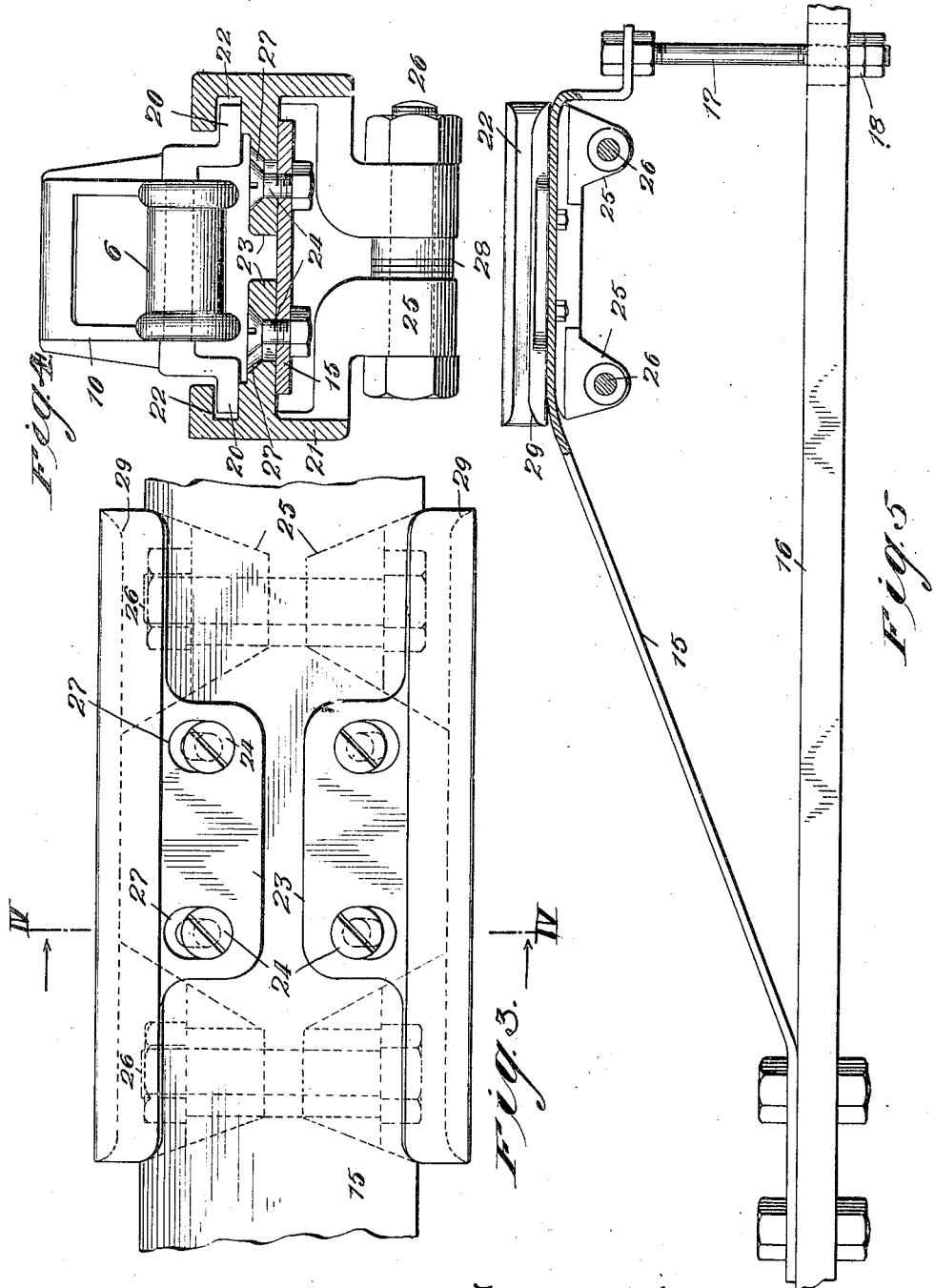

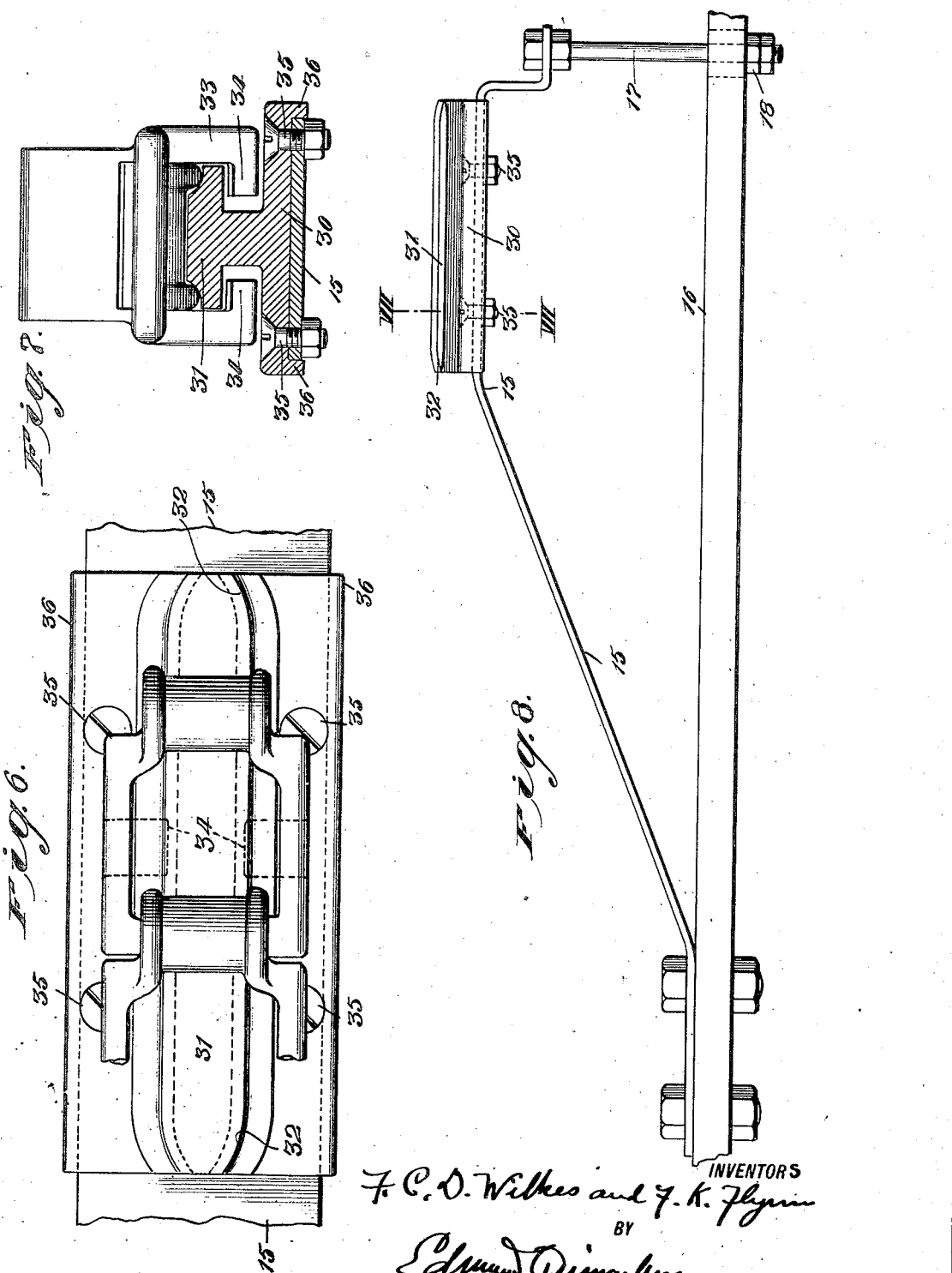

1,429,991

UNITED STATES PATENT OFFICE.

FREDERICK C. DOUGLAS WILKES AND FRANCIS K. FLYNN, OF WATERTOWN, WISCONSIN, ASSIGNORS, BY MESNE ASSIGNMENTS, TO LUCE CANE HARVESTER CORPORATION, OF NEW YORK, N. Y., A CORPORATION OF DELAWARE.

CONVEYER-CHAIN GUIDE FOR CANE HARVESTERS AND THE LIKE.

Application filed August 29, 1919. Serial No. 320,696.

*To all whom it may concern:*

Be it known that we, FREDERICK C. DOUGLAS WILKES, a citizen of the Dominion of Canada, and FRANCIS K. FLYNN, a citizen of the United States, both residing in Watertown, county of Jefferson, and State of Wisconsin, have invented certain new and useful Improvements in Conveyer-Chain Guides for Cane Harvesters and the like, of which the following is a specification.

This invention relates to cane harvesters and similar machinery, and particularly to the construction of the chains and guiding means therefor which are utilized to convey the cane through the machine.

In the patent to George D. Luce, No. 1,053,917 a cane harvester is described in which the cane is severed at the bottom by rotary disc cutters and is immediately seized while in a substantially erect position by conveyer chains which are yieldingly pressed against the cane from opposite sides so as to grip it firmly and hold it substantially erect or somewhat inclined toward the rear while conveying it rearwardly and upwardly through the machine past the topping and stripping devices. For the purpose of illustrating the present invention we have shown the same as applied in an improved machine of that type, the particular improved form of the machine being set forth in a pending application of George D. Luce, Serial No. 296,539, filed May 12, 1919. It will be understood, however, that the invention is not limited to use only in that particular type of machine.

The principal object of the invention is the provision of improved yielding guiding means for the conveyer chains which will prevent such chains from being displaced during operation, while at the same time not interfering with the free yielding movement of the chains whereby they are enabled properly to grip and hold the cane.

In the accompanying drawings forming a part of this specification, and which show certain preferred embodiments of the invention as illustrative of the principle thereof, and the best mode now known to us for performing the same, Figure 1 is a plan view of the upper part of the conveyer chain drive of a cane harvester having our invention embodied therein;

Figure 2 is a diagrammatic sectional view through the operative runs of the conveyer chains and the guiding means therefor, taken on line II—II of Figure 1;

Figure 3 is an enlarged face view showing one of the guides for the chain;

Figure 4 is a transverse section on line IV—IV of Figure 3;

Figure 5 is a view partly in plan and partly in section showing one of the yielding chain presser bars with the guide channel attached thereto;

Figure 6 is a face view of a modified form of chain guide;

Figure 7 is a transverse section of the same, taken on line VII—VII of Figure 8;

Figure 8 is a plan view showing one of the presser bars with the modified form of chain guide attached thereto.

Referring to the drawings in detail, in the harvester in connection with which the present invention is illustrated, as soon as the cane is severed it is seized between the conveyer chains 6 and 7, three of which are preferably employed, one being mounted on one side of the cane and the other two being mounted on the opposite side of the cane, one above and one below the plane of the first chain. This arrangement of the chains is shown in Figure 2 and provides for the engagement of each stalk at three spaced points which results in the cane being firmly held in position while being conveyed through the machine. Each of the chains passes over sprockets at its upper and lower ends, the sprockets at the upper ends of the chains being shown at 8 in Figure 1. These upper sprockets are preferably driven by suitable gearing from the motor of the harvester so as to drive the chains, the adjacent runs of which travel from front to rear of the machine. Means are preferably provided for guiding the chains on to the driving sprockets in the form of forks 9, between the arms of which the chains enter as they pass on to the sprockets, as set forth in said application of George D. Luce. One or more of the chains, preferably the single chain 6, is provided at intervals with links having projecting lugs 10 which assist in gripping the cane and preventing displacement thereof. In the form of the machine shown the butts of the cane are supported while the cane is being conveyed through the machine by traveling belts and the cane, while being conveyed through the machine by the chains 6 and 7 is operated upon by a topping knife and stripping brushes, as described in said Luce application.

For the purpose of applying pressure to the chains at intervals throughout the length of their runs or stretches so as to urge them into gripping engagement with the cane, yielding pressers are provided, which in the construction illustrated are in the form of flat steel springs 15 attached at their forward ends to the frame members 16 and inclining rearwardly and inwardly towards the adjacent or active stretches of the chains. These members exert a pressure on the backs of the chains so as to force them towards each other and at the same time permit them to yield to a more or less extent, depending upon the size of the cane, as the cane passes along with the chains. To prevent the pressers from springing out too far, limiting bolts 17 are preferably provided which are attached to the offset outer ends of the presser springs and pass through holes in the frame members 16, the bolts having limiting nuts 18 on their outer ends. In order to guide the chains in proper horizontal alignment and to prevent the chains from becoming displaced with relation to the pressers, co-acting guiding means are provided on the chain and presser members and it is to this feature of construction to which the present invention particularly relates. One preferred form of means for accomplishing this interlocking guiding engagement is illustrated in detail in Figures 1, 2, 3, 4, and 5, where it is seen that each link of the chain is provided with the laterally projecting ears 20 which combine in the several links to form a sort of rib or flange along each edge of the chain. On the free end of each of the presser members is fixed a pair of guide channel members 21 having the inwardly opening channels 22 which receive and guide the ears on the links, as clearly shown in Figure 4. These channel members are adapted to be mounted on the spring presser members in any suitable manner. For instance in the construction illustrated each of the members is provided with an inwardly extending flange 23 which is adapted to rest upon the spring presser member and to be secured thereto by the bolts 24. The guide members are also provided with projecting lugs 25 adapted to be bolted together by the bolts 26. Provision is preferably made for a limited lateral adjustment of the guide members to allow for possible inequalities in dimensions of the chain and to take up for wear when necessary, this adjustment being secured in the construction illustrated by making the holes through which the bolts 24 pass somewhat elongated as shown at 27, and by using one or more spacing washers 28 on the bolts 26 between the lugs 25. The end portions of the guide channels 22 are preferably flared out, as indicated at 29 so as to permit the links of the chain to pass successively into engagement therewith, without catching.

In Figures 6, 7 and 8 we have illustrated a modified form of chain links and guiding means adapted to cooperate therewith, in which the presser members 15 are provided with the guide blocks 30 which have the projecting T-head portions 31. The ends of these T-head guide portions are preferably tapered or rounded off, as shown at 32 in Figures 6 and 8. The chain links intended to cooperate with these guides are provided preferably near the middle of their side portions with the rearwardly projecting lugs 33 having the ears 34 hooked under the projections. The guides 30 may be attached to the presser members 15 in any suitable manner, for instance, by the bolts 35. The guides are furthermore preferably provided with the flanges 36 adapted to engage the opposite edges of the presser members so as to more firmly hold the guides in place thereon.

The construction described provides a simple and effective means for the proper guiding of the active runs or stretches of the conveyer chains at numerous points in the length thereof and prevents the chains from sagging or being pushed up or down by the cane in such a way as to become disengaged from the spring pressers. This insures the proper action of the chains at all times and prevents any of the canes from dropping or slipping out, due to the chains slipping off the spring pressers and so releasing the pressure on the cane.

While we have shown and described in detail certain preferred embodiments of our invention, it will be understood that modifications may be made therein and we do not therefore intend to limit ourselves to such specific embodiments, but desire to be understood as covering our invention broadly in whatever form its principle may be embodied.

Having thus described our invention, we claim:—

1. In apparatus of the character described a plurality of conveyer chains adapted to grasp the cane between them, yielding means for pressing the chains into engagement with the cane and means for preventing the lateral displacement of the chains with respect to said yielding presser means.

2. In apparatus of the character described, a plurality of conveyer chains adapted to grasp the cane between them, yielding means for pressing the chains into engagement with the cane, and guides on said yielding presser means engaging the chains and adapted to hold the same in alignment with said presser means as the chains travel thereover.

3. In apparatus of the character described, a plurality of conveyer chains adapted to grasp the cane between them, yielding means for pressing the chains in engagement with the cane, and interlocking means on said chains and yielding presser means respectively, for guiding said chains in alignment with said presser means.

4. In a machine of the character described, a plurality of conveyer chains adapted to grasp the cane between them, said chains being provided with guide flanges, and yielding means for holding the chains in engagement with the cane, said yielding means being provided with devices engaging the flanges on the chains.

5. In a machine of the character described, a presser member, a guide member thereon having an elongated T-shaped head, and a conveyer chain adapted to slide in contact with said head and having overhanging portions engaging beneath the same.

6. In apparatus of the character described, a yielding presser member having a guiding portion and a conveyer chain adapted to travel over said guiding portion and having flanges passing on opposite sides of said guiding portion for maintaining alignment between said yielding presser member and chain.

7. In apparatus of the character described, a plurality of conveyer chains adapted to grasp the cane between them, leaf springs for holding the chains in engagement with the cane and guide means carried by said leaf springs for preventing lateral displacement of said chains with respect to said springs.

8. In apparatus of the character described, the combination of a cane conveying chain and a presser spring adapted to cooperate therewith, said spring being supported at one end and extending beside the chain in the direction of travel thereof and inclined outwardly so that its free end is adjacent the back of the chain, and guide means carried by the free end of said spring and adapted to cooperate with the chain to prevent lateral displacement of the latter.

9. In apparatus of the character described, the combination of a conveyer chain, a leaf spring attached to a fixed support at one end and having its free end adapted to exert pressure on the back of the chain, and a guide piece carried by the free end of said spring interlocking with the chain to prevent lateral displacement thereof with respect to said spring.

10. In apparatus of the character described, the combination of a leaf presser spring having a block attached to the free end thereof, said block having an elongated T-shaped head, and a conveyer chain having rearwardly and inwardly hooked members adapted to interlock with said T-head.

11. In apparatus of the character described, the combination of a conveyer chain having links provided near their middle with rearwardly and inwardly extending hooked extensions, and a yielding presser member having an elongated T-shaped head cooperating with said extensions and forming a chain guide.

12. In apparatus of the character described, the combination of a conveyer chain having links provided with rearwardly and inwardly extending hooked extensions, and yielding presser means cooperating with said extensions and forming a chain guide.

13. For use in combination with yielding presser means forming a chain guide, chain links having rearwardly and inwardly extending hooked extensions adapted to cooperate with said yielding presser means.

14. In apparatus of the character described, a cane conveyer comprising a group of three chains, two of said chains being located at one side of the line of travel of the cane and being spaced one above the other and the third chain being located upon the opposite side of the line of travel of the cane and intermediate of said first two chains, spring pressers for urging the chains into engagement with the cane and guides carried by said spring pressers for preventing lateral displacement of the chains.

F. C. DOUGLAS WILKES.
FRANCIS K. FLYNN.